US012707018B2

(12) United States Patent
Ruan et al.

(10) Patent No.: US 12,707,018 B2
(45) Date of Patent: Aug. 11, 2026

(54) SWITCHING METHOD FOR VIDEO CONFERENCE AND VIDEO CONFERENCE SYSTEM

(71) Applicant: Acer Incorporated, New Taipei City (TW)

(72) Inventors: Yu-Shan Ruan, New Taipei City (TW); Liang-Chi Chen, New Taipei City (TW)

(73) Assignee: Acer Incorporated, New Taipei City (TW)

( * ) Notice: Subject to any disclaimer, the term of this patent is extended or adjusted under 35 U.S.C. 154(b) by 290 days.

(21) Appl. No.: 18/499,212

(22) Filed: Nov. 1, 2023

(65) Prior Publication Data

US 2025/0088603 A1 Mar. 13, 2025

(30) Foreign Application Priority Data

Sep. 12, 2023 (TW) ................................ 112134609

(51) Int. Cl.
*H04N 5/268* (2006.01)
*G06V 10/70* (2022.01)
(Continued)

(52) U.S. Cl.
CPC ............ *H04N 5/268* (2013.01); *G06V 10/82* (2022.01); *G06V 10/87* (2022.01); *G06V 20/41* (2022.01);
(Continued)

(58) Field of Classification Search
CPC ........ H04N 5/268; G06V 10/82; G06V 10/87; G06V 20/41; G06V 40/161; G10L 25/30; G10L 25/57
See application file for complete search history.

(56) References Cited

U.S. PATENT DOCUMENTS 10,891,884 B1 * 1/2021 Yang ............. G01R 31/318583
2008/0095040 A1 * 4/2008 Kwon ................ H04L 27/2636
370/210

(Continued)

FOREIGN PATENT DOCUMENTS

CN 102638646 8/2012
CN 103281508 11/2016

(Continued)

*Primary Examiner* — Duc Nguyen
*Assistant Examiner* — Saad Ahmed Syed
(74) *Attorney, Agent, or Firm* — JCIPRNET

(57) ABSTRACT

A switching method for video conference and a video conference system are disclosed. The switching method for video conference is adapted to a video conference system including a first camera device and a second camera device, and includes the following steps. A first captured image of the first camera device and a second captured image of the second camera device are obtained. Image-object recognition is performed for the first captured image and the second captured image respectively by using a neural network model. According to a model recognition result of the first captured image and a model recognition result of the second captured image, a video source of the video conference is switched to the first camera device or the second camera device. The video conference is carrying out based on images from the video source.

14 Claims, 7 Drawing Sheets

(51) Int. Cl.

| | |
|---|---|
| ***G06V 10/82*** | (2022.01) |
| ***G06V 20/40*** | (2022.01) |
| ***G06V 40/16*** | (2022.01) |
| ***G10L 25/30*** | (2013.01) |
| ***G10L 25/57*** | (2013.01) |

(52) U.S. Cl.
CPC ............ *G06V 40/161* (2022.01); *G10L 25/30* (2013.01); *G10L 25/57* (2013.01)

(56) References Cited

U.S. PATENT DOCUMENTS

| | | | | |
|---|---|---|---|---|
| 2012/0063671 | A1* | 3/2012 | Yamada ................. | G06V 40/40 382/154 |
| 2020/0280702 | A1* | 9/2020 | Singh ....................... | G06N 3/04 |
| 2023/0036861 | A1* | 2/2023 | Lum ..................... | H04M 3/568 |
| 2023/0316748 | A1* | 10/2023 | Raghavan .............. | G06V 10/74 382/159 |
| 2024/0357231 | A1* | 10/2024 | Liu ........................ | H04N 23/62 |

FOREIGN PATENT DOCUMENTS

| | | |
|---|---|---|
| TW | 201110698 | 3/2011 |
| TW | 201230786 | 7/2012 |
| TW | 202011252 | 3/2020 |
| TW | 202207703 | 2/2022 |

* cited by examiner

SWITCHING METHOD FOR VIDEO CONFERENCE AND VIDEO CONFERENCE SYSTEM

CROSS-REFERENCE TO RELATED APPLICATION

This application claims the priority benefit of Taiwan application serial no. 112134609, filed on Sep. 12, 2023. The entirety of the above-mentioned patent application is hereby incorporated by reference herein and made a part of this specification.

BACKGROUND

Technical Field

The invention relates to a video conference method, and particularly relates to a switching method for a video conference and a video conference system.

Description of Related Art

Due to advancement of science and technology, a trend of globalization, a demand for remote work, remote teaching, and various other factors, it has become quite common for many people to use video conference software at home to conduct remote work or online courses. Therefore, in order to allow users to conduct a video conference more conveniently and meet the needs of various operating situations, how to improve video conference technology is a topic of great concern to those skilled in the art. For example, in some application situations, the user may use captured content of more than one camera device to generate a video conference screen, but the user needs to manually switch the camera devices during the video conference to obtain the video conference screen that meets the current needs, and such operation process is quite cumbersome and inconvenient.

SUMMARY

The invention is directed to a switching method for a video conference and a video conference system, which are adapted to automatically switch camera devices during a video conference, thereby improving convenience of the video conference.

An embodiment of the invention provides a switching method for a video conference adapted to a video conference system including a first camera device and a second camera device, and includes the following steps. A first captured image of the first camera device and a second captured image of the second camera device are obtained. Image-object recognition is respectively performed for the first captured image and the second captured image by using a neural network model. According to a model recognition result of the first captured image and a model recognition result of the second captured image, a video source of the video conference is switched to the first camera device or the second camera device. The video conference is carried out based on images from the video source.

An embodiment of the invention provides a video conference system including a first camera device, a second camera device a storage device, and a processor. The storage device stores multiple instructions. The processor is coupled to the first camera device, the second camera device, and the storage device, and executes the instructions to: obtain a first captured image of the first camera device and a second captured image of the second camera device; respectively perform image-object recognition for the first captured image and the second captured image by using a neural network model; switch a video source of a video conference to the first camera device or the second camera device according to a model recognition result of the first captured image and a model recognition result of the second captured image; and carry out the video conference based on images from the video source.

Based on the above description, in the embodiments of the invention, during a process of executing the video conference, the neural network model may be used to respectively perform image-object recognition for images captured by multiple camera devices, so that one of the multiple camera devices may be automatically switched to the video source of the video conference based on the model recognition results of the captured images. In this way, the tedious steps of manually switching the camera devices during the video conference may be saved.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Some embodiments of the invention will be described in detail with reference to the accompanying drawings. The component symbols cited in the following description will be regarded as representing the same or similar components when the same component symbols appear in different drawings. These embodiments are only a part of the invention and do not disclose all possible implementations of the invention. Rather, these embodiments are merely examples of devices and methods within the scope of the patent application of the invention.

Figure 1:
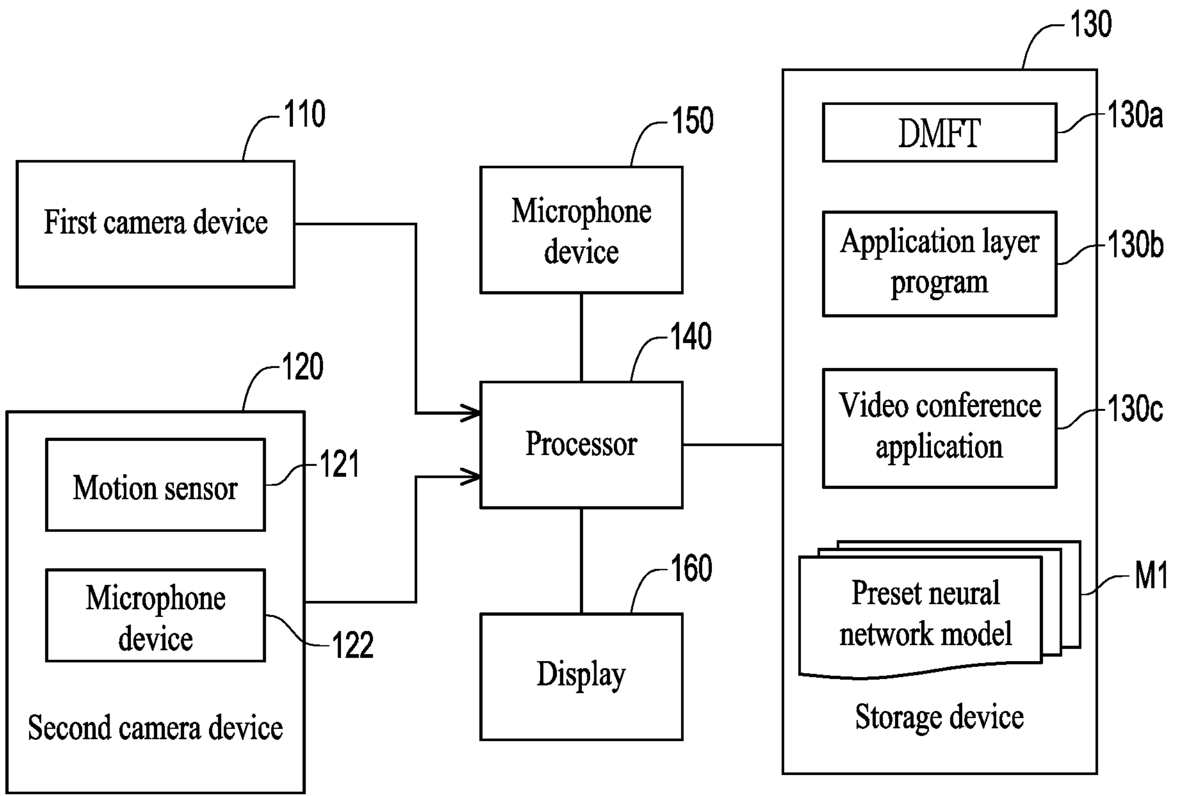
FIG. 1 is a schematic diagram of a video conference system according to an embodiment of the invention.

FIG. 1 is a schematic diagram of a video conference system according to an embodiment of the invention. Referring to FIG. 1, a video conference system 10 may include a first camera device 110, a second camera device 120, a storage device 130, a processor 140, a microphone device 150, and a display 160. The video conference system 10 may conduct a video conference with other user terminal devices through a network. The above network may include any of a variety of wireless and/or wired networks. For example, the network may include any combination of a public and/or private network, a local area network, and/or a wide area network, etc.

In some embodiments, the video conference system 10 may be implemented as including a computer device with a built-in first camera device 110 and a second camera device 120 externally connected to the computer device. Specifically, the above-mentioned computer device may include the first camera device 110, the storage device 130, the processor 140, the microphone device 150, and the display 160. The above-mentioned computer device may be, for example, a tablet computer, a notebook computer, or a desktop computer, which is not limited by the invention. In other words, the first camera device 110 may be a built-in camera built into the computer device. In addition, the second camera device 120 may be connected to the above-mentioned computer device in a wired or wireless manner.

Alternatively, in some embodiments, the video conference system 10 may also be implemented by integrating the first camera device 110, the second camera device 120, the storage device 130, the processor 140, the microphone device 150, and the display 160 into a single electronic device. For example, the video conference system 10 may be implemented as a computer device with multiple built-in camera modules, which is not limited by the invention. The above-mentioned computer device is, for example, a tablet computer, a notebook computer, or a desktop computer, which is not limited by the invention.

Alternatively, in some embodiments, the video conference system 10 may be implemented to include a computer device and the first camera device 110 and the second camera device 120 externally connected to the computer device. To be specific, the above-mentioned computer device may include the storage device 130, the processor 140, the microphone device 150, and the display 160, and the computer device is, for example, a tablet computer, a notebook computer, or a desktop computer, but the invention is not limited thereto. In addition, the first camera device 110 and the second camera device 120 may be connected to the above-mentioned computer device in a wired or wireless manner.

In some embodiments, the first camera device 110 and the second camera device 120 may be connected to the processor 140 via a wireless communication interface. The above-mentioned wireless transmission interface is, for example, a Bluetooth interface, a WiFi interface, or other wireless transmission interfaces. Alternatively, the first camera device 110 and the second camera device 120 may also be connected to the processor 140 via a wired transmission interface. The above-mentioned wired transmission interface is, for example, a USB interface or other wired transmission interfaces.

In some embodiments, the second camera device 120 may be a mobile electronic device with a photography function, such as a mobile phone, a tablet computer, a digital camera, etc., but the invention is not limited thereto. In some embodiments, the second camera device 120 may be an external camera or a network camera, etc., but the invention is not limited thereto. For example, the video conference system 10 may be composed of a notebook computer or a desktop computer and an external camera. Alternatively, the video conference system 10 may be composed of a notebook computer or a desktop computer and a smart phone.

In some embodiments, the second camera device 120 may include a motion sensor 121 and a microphone device 122. The motion sensor 121 is, for example, a gyroscope, an acceleration sensor, or a gravity sensor, etc. The motion sensor 121 may be used to sense a moving trajectory, a motion or posture, etc., of the second camera device 120.

The microphone device 122 and the microphone device 150 are audio generating devices that may convert sound waves into electronic sound signals. For example, the microphone device 122 and the microphone device 150 may be used to receive sound signals generated by a user's speech.

The first camera device 110 and the second camera device 120 may be used to capture continuous images to generate a video stream, and respectively include a camera lens having a lens and a photosensitive element. The photosensitive element is used to sense an intensity of light entering the lens to generate an image. The photosensitive element may be, for example, a charge coupled device (CCD), a complementary metal-oxide semiconductor (CMOS) element, or other elements, which is not limited by the invention.

The storage device 130 is used to store files, images, instructions, program codes, software components, etc., which may be, for example, any type of fixed or removable random access memory (RAM), read-only memory (ROM), flash memory, hard disk or other similar device, integrated circuit, or a combination thereof.

The display 160 is, for example, a liquid crystal display (LCD), a light-emitting diode (LED) display, an organic light-emitting diode (OLED) display, or other types of displays, which is not limited by the invention. The display 160 may be used to display a video conference screen of a video conference.

The processor 140 is, for example, a central processing unit (CPU), an application processor (AP), or other programmable general-purpose or special-purpose microprocessor, digital signal processor (DSP), image signal processor (ISP), graphics processing unit (GPU) or other similar devices, integrated circuits, or combinations thereof.

The processor 140 may execute the program codes, software/firmware modules, instructions, etc. recorded in the storage device 130 to implement a switching method for a video conference according to the embodiment of the invention. In other words, the processor 140 may be configured to perform respective corresponding operations described below.

In more detail, in the embodiment of the invention, the storage device 130 may record a device media foundation transform (DMFT) 130*a*, an application layer program 130*b*, and a video conference application 130*c*, and the processor 140 may execute the DMFT 130*a*, the application layer program 130*b*, and the video conference application 130*c*. In addition, the storage device 130 may record multiple trained preset neural network models M1. Model parameters and model frameworks of the trained preset neural network models M1 are recorded in the storage device 130.

The DMFT 130*a* is executed in a user mode of an operating system. The DMFT 130*a* is a user mode extension function. Furthermore, The DMFT 130*a* is a special media foundation transformer (MFT). The DMFT 130*a* may provide some frame processing functions, such as video editing and image stabilization functions, etc., for the video conference application 130*c*. More specifically, the DMFT 130*a* may be encapsulated in a camera driver stack and configured to perform post-image processing on video streams obtained from the first camera device 110 and the second camera device 120. The DMFT 130*a* may have one or multiple input data streams and one or multiple output data streams.

In the embodiment of the invention, the application layer program 130*b* may be a plug-in application program independent to an operation process of the DMFT 130*a*, which may be used to capture captured images transmitted in a processing pipeline of the DMFT 130*a*. The application layer program 130*b* may use these preset neural network models M1 to analyse the captured image content of multiple camera devices (i.e., the first camera device 110 and the second camera device 120), so as to control the DMFT 130*a* to output a video stream captured by a certain camera device to the video conference application 130*c* according to the captured image content of the multiple camera devices. In this way, a video source of the video conference may be automatically switched between the multiple camera devices.

Figure 2:
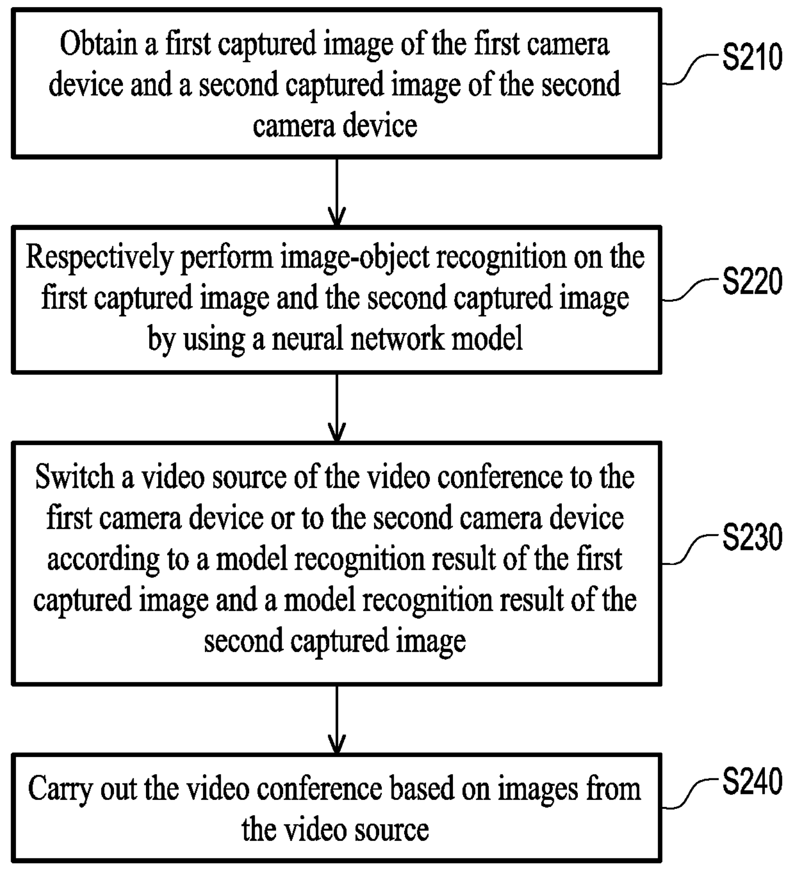
FIG. 2 is a flowchart of a switching method for a video conference according to an embodiment of the invention.

FIG. 2 is a flowchart of a switching method for a video conference according to an embodiment of the invention. Referring to FIG. 2, the method of the embodiment is applicable to the video conference system 10 of the above embodiment. Detailed steps of the embodiment will be described below with reference of various components in the video conference system 10.

In step S210, during the process of executing the video conference, the processor 140 may obtain a first captured image of the first camera device 110 and a second captured image of the second camera device 120. Specifically, the processor 140 may execute the video conference application 130*c* to carry on the video conference. During the process of the video conference, the processor 140 may transmit the video stream captured by the first camera device 110 or the second camera device 120 to other terminal devices through the network, so that video conference participants may see a video stream of the users of the conference system 10. In more detail, during the process of the video conference, the DMFT 130*a* may transmit the video stream captured by the first camera device 110 or the second camera device 120 to the video conference application 130*c*.

In some embodiments, the processor 140 may use the application layer program 130*b* to obtain the first captured image of the first camera device 110 and the second captured image of the second camera device 120 through the DMFT 130*a*. In some embodiments, the DMFT 130*a* may provide an application programming interface (API) to allow the application layer program 130*b* to obtain the first captured image and the second captured image from a shared memory.

In step S220, the processor 140 uses a neural network model to respectively perform image-object recognition for the first captured image and the second captured image. The neural network model may be a trained convolutional neural network model. From another perspective, the neural network model is an object recognition model, which is used to recognize one or more specific objects from an input image. The neural network model is, for example, R-CNN, Fast R-CNN, Faster R-CNN, YOLO, or SSD, etc. used for object detection in a convolution neural network (CNN) model. The invention does not limit a network framework used by the neural network model. After the neural network model respectively performs image-object recognition for the first captured image and the second captured image, a model recognition result of the first captured image and a model recognition result of the second captured image may respectively include a recognition result of a specific object. The above-mentioned specific object is, for example, a human face, an animal, an introduced product, or other objects, etc., which is not limited by the invention. In some embodiments, when the processor 140 detects a specific object in the captured image (i.e., the first captured image or the second captured image) by using the neural network model, the model recognition result of the captured image (i.e., the first captured image or the second captured image) may include a recognition confidence rate, an object category, an object position, etc., of the specific object.

In some embodiments, the neural network model may be trained based on multiple training images labelled with the specific object. More specifically, after planning the convolutional neural network framework of the neural network model, the training images and classification answer information of each training image must be used to determine weight information in the neural network model, so as to train the neural network model that may recognize the specific object from the input images.

In step S230, the processor 140 switches a video source of the video conference to the first camera device 110 or to the second camera device 120 according to the model recognition result of the first captured image and the model recognition result of the second captured image. Namely, based on image content of the first captured image and image content of the second captured image, the processor 140 switches the video source of the video conference from the first camera device 110 to the second camera device 120. Alternatively, based on the image content of the first captured image and the image content of the second captured image, the processor 140 switches the video source of the video conference from the second camera device 120 to the first camera device 110. In some embodiments, the processor 140 switches the video source of the video conference to the first camera device 110 or to the second camera device 120 by controlling an output data stream of the DMFT 130*a*. When the processor 140 switches the video source of the video conference to the first camera device 110, the DMFT 130*a* transmits the video stream generated by the first camera device 110 to the video conference application 130*c*. Alternatively, when the processor 140 switches the video source of the video conference to the second camera device 120, the DMFT 130*a* transmits the video stream generated by the second camera device 120 to the video conference application 130*c*.

In some embodiments, the processor 140 may simultaneously perform image-object recognition for the first captured image and the second captured image, thereby saving a computing time and achieving a real-time switching effect. For example, a first computing kernel of the processor 140 is in charge of image-object recognition of the first captured image, and at the same time, the second computing kernel of the processor 140 is in charge of image-object recognition of the second captured image.

In step S240, the processor 140 carries out a video conference based on images from the video source. When carrying on the video conference, the processor 140 may transmit the images of the video source to other conference participants of the video conference through the network. Namely, when the video source of the video conference is switched to the first camera device 110, the video stream captured by the first camera device 110 is transmitted to the other conference participants of the video conference. Alternatively, when the video source of the video conference is switched to the second camera device 110, the video stream captured by the second camera device 110 is transmitted to the other conference participants of the video conference.

Figure 3:
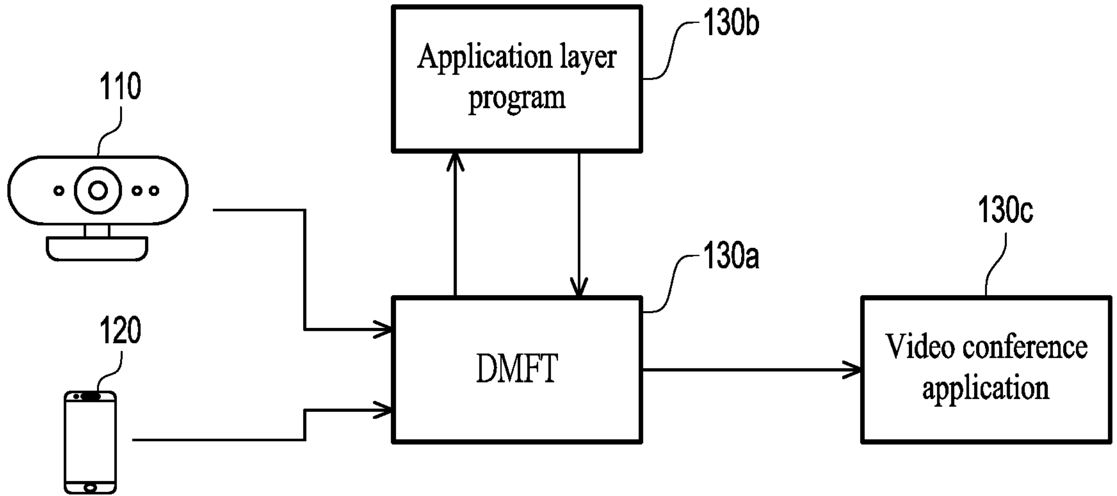
FIG. 3 is a schematic diagram of a switching method for a video conference according to an embodiment of the invention.

FIG. 3 is a schematic diagram of a switching method for a video conference according to an embodiment of the invention. Referring to FIG. 3, the DMFT 130*a* obtains the video streams respectively captured by the first camera device 110 and the second camera device 120. The above video streams include multiple captured images. The application layer program 130*b* may retrieve the first captured image of the first camera device 110 and the second captured image of the second camera device 120 from the DMFT 130*a*. The application layer program 130*b* may use a neural network model to perform image-object recognition for the first captured image and the second captured image. According to a model recognition result of the first captured image and a model recognition result of the second captured image, the application layer program 130*b* may transmit a switching request instruction to the DMFT 130*a*. In response to the switching request instruction of the application layer program 130*b*, the DMFT 130*a* may choose to output the video stream of the first camera device 110 or the video stream of the second camera device 120 to the video conference software 130*c*, and the video conference software 130*c* transmits the video stream of the first camera device 110 or the video stream of the second camera device 120 to the other conference participants.

It can be seen that based on the image content captured by different camera devices, the processor 140 may automatically switch the video source of the video conference to a specific camera device among multiple camera devices. Therefore, a video screen of the user in the video conference may meet a conference situation requirement. In addition, based on different conference situation requirements, the processor 140 may automatically switch the video source of the video conference to the specific camera device among the camera devices according to appropriate judgment conditions. Subsequent embodiments will describe different switching conditions.

Figure 4:
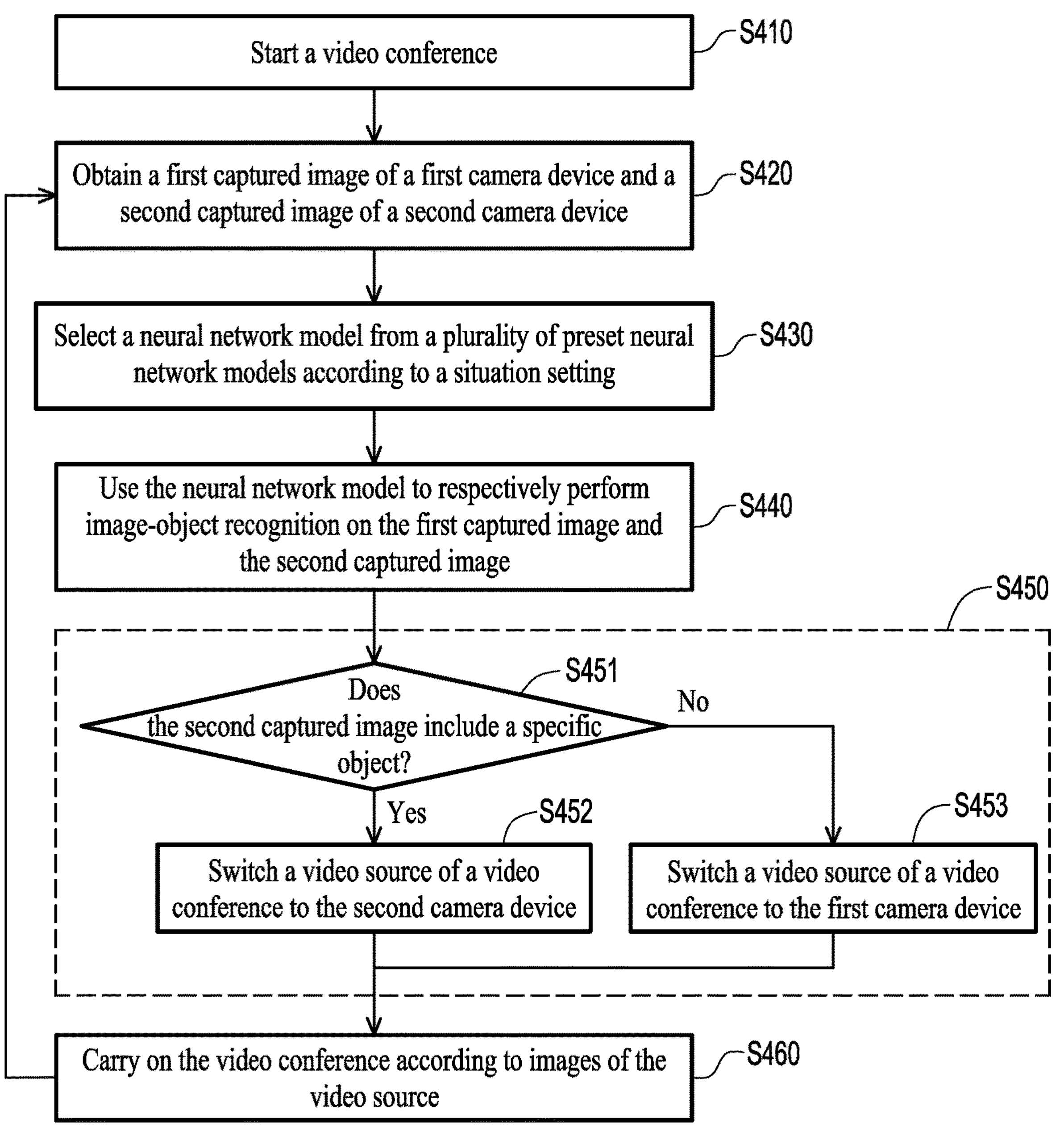
FIG. 4 is a flowchart of a switching method for a video conference according to an embodiment of the invention.

FIG. 4 is a flowchart of a switching method for a video conference according to an embodiment of the invention. Referring to FIG. 4. The method of the embodiment is applicable to the video conference system 10 of the above embodiment. Detailed steps of the embodiment will be described below with reference of various components in the video conference system 10.

In step S410, the processor 140 starts the video conference. In step S420, the processor 140 obtains the first captured image of the first camera device 110 and the second captured image of the second camera device 120. Implementations and details of the above steps S410-S420 have been described in detail in the aforementioned embodiments of FIG. 1 to FIG. 3, which will not be repeated here.

In step S430, according to a situation setting, the processor 140 selects a neural network model from the preset neural network models M1. The preset neural network models M1 include an object recognition model or a face recognition model. The situation setting may be set based on a user instruction issued by the user. For example, it is assumed that the situation setting is a face tracking mode, the processor 140 may select the face recognition model from the preset neural network models M1 to perform subsequent operations. The face recognition model is used to perform face recognition on the first captured image and the second captured image. It is assumed that the situation setting is a product introduction mode, the processor 140 may select the object recognition model from the preset neural network models M1 to perform subsequent operations. The object recognition model is used to detect a specific product object in the first captured image and the second captured image.

In step S440, the processor 140 uses the neural network model to respectively perform image-object recognition for the first captured image and the second captured image. In step S450, the processor 140 switches the video source of the video conference to the first camera device 110 or to the second camera device 120 according to the model recognition result of the first captured image and the model recognition result of the second captured image. Here, step S450 may be implemented as steps S451 to S453.

In the embodiment, in step S451, the processor 140 determines whether the second captured image includes a specific object. For example, the processor 140 may input the second captured image into the neural network model to generate an object recognition result of the specific object. The above-mentioned object recognition result may include a recognition confidence rate of the specific object. When the recognition confidence rate of the specific object is greater than a threshold value, the processor 140 may determine that the second captured image includes the specific object. When the recognition confidence rate of the specific object is not greater than the threshold value, the processor 140 may determine that the second captured image does not include the specific object.

In step S452, in response to the neural network model detecting that the second captured image includes the specific object (determined as yes in step S451), the processor 140 switches the video source of the video conference to the second camera device 120. In step S453, in response to the neural network model detecting that the second captured image does not include the specific object (determined as NO in step S451), the processor 140 switches the video source of the video conference to the first camera device 110. In step S460, the processor 140 carries on the video conference according to the images of the video source.

For example, the first camera device 110 may be a built-in main camera of a notebook computer, and the second camera device 120 may be a mobile phone device. When it is determined that the captured image of the mobile phone device includes a face object, the processor 140 may switch the video source of the video conference to the mobile phone device. On the contrary, when it is determined that the image captured by the mobile phone device does not include a face object, the processor 140 may switch the video source of the video conference to the built-in main camera of the notebook computer.

Figure 5:
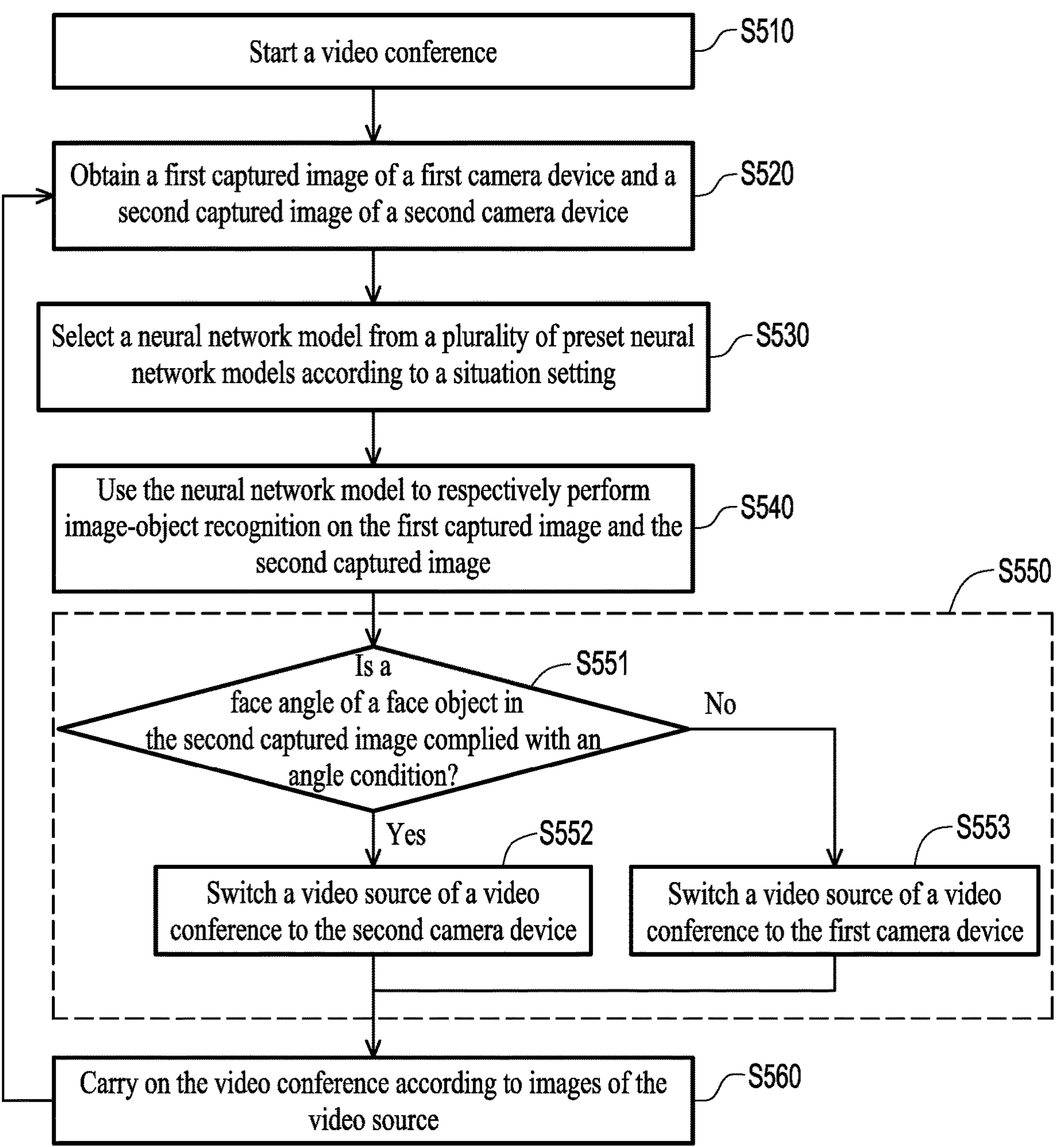
FIG. 5 is a flowchart of a switching method for a video conference according to an embodiment of the invention.

FIG. 5 is a flowchart of a switching method for a video conference according to an embodiment of the invention. Referring to FIG. 5, the method of the embodiment is applicable to the video conference system 10 of the above embodiment. Detailed steps of the embodiment are described below with reference of various components in the video conference system 10.

In step S510, the processor 140 starts the video conference. In step S520, the processor 140 obtains the first captured image of the first camera device 110 and the second captured image of the second camera device 120. In step S530, according to a situation setting, the processor 140 selects a neural network model from the preset neural network models M1. The preset neural network models M1 include an object recognition model or a face recognition model. Implementations and details of the above steps S510-S540 have been described in detail in the aforementioned embodiments of FIG. 1 to FIG. 4, which will not be repeated here.

In step S540, the processor 140 uses the neural network model to respectively perform image-object recognition for the first captured image and the second captured image. In the embodiment, the processor 140 selects the face recognition model from the preset neural network models M1. In some embodiments, the face recognition model may recognize a face object and multiple face feature points (such as eye feature points, nose feature points, mouth feature points, etc.) from an input image. The processor 140 may calculate a face angle based on these face feature points. In some embodiments, the face recognition model may directly recognize the face object and the corresponding face angle from the input image. The face recognition model may be implemented by using any face recognition technology well known to those with ordinary knowledge in the art, which is not limited by the invention.

In step S550, the processor 140 switches the video source of the video conference to the first camera device 110 or to the second camera device 120 according to the model recognition result of the first captured image and the model recognition result of the second captured image. Here, step S550 may be implemented as steps S551 to S553. In the embodiment, the model recognition result includes the face object and the corresponding face angle.

In step S551, the processor 140 determines whether the face angle of the face object in the second captured image is complied with an angle condition. In some embodiments, the processor 140 determines whether a second angle difference between the face angle of the face object in the second captured image and a preset angle is smaller than a first angle difference between the face angle of the face object in the first captured image and the preset angle. Namely, the processor 140 determines whether the face angle of the face object in the second captured image is closer to the preset angle. Alternatively, in some embodiments, the processor 140 determines whether the face angle of the face object in the second captured image falls within a specific angle range.

In step S552, in response to the neural network model detecting that the face angle of the face object in the second captured image is complied with the angle condition (determined as yes in step S551), the processor 140 switches the video source of the video conference to second camera device 120. In step S553, in response to the neural network model detecting that the face angle of the face object in the second captured image is not complied with the angle condition (determined as no in step S551), the processor 140 switches the video source of the video conference to the first camera device 110. In step S560, the processor 140 carries on the video conference according to the images of the video source.

For example, the first camera device 110 may be a built-in main camera of a notebook computer, and the second camera device 120 may be a mobile phone device. When the user's face faces the mobile phone device, the processor 140 determines that the face angle of the face object in the second captured image is complied with the angle condition, and switches the video source of the video conference to the mobile phone device. On the contrary, when the user's face does not face the mobile phone device, the processor 140 determines that the face angle of the face object in the second captured image is not complied with the angle condition, and the processor 140 may switch the video source of the video conference to the built-in main camera of the notebook computer.

Figure 6:
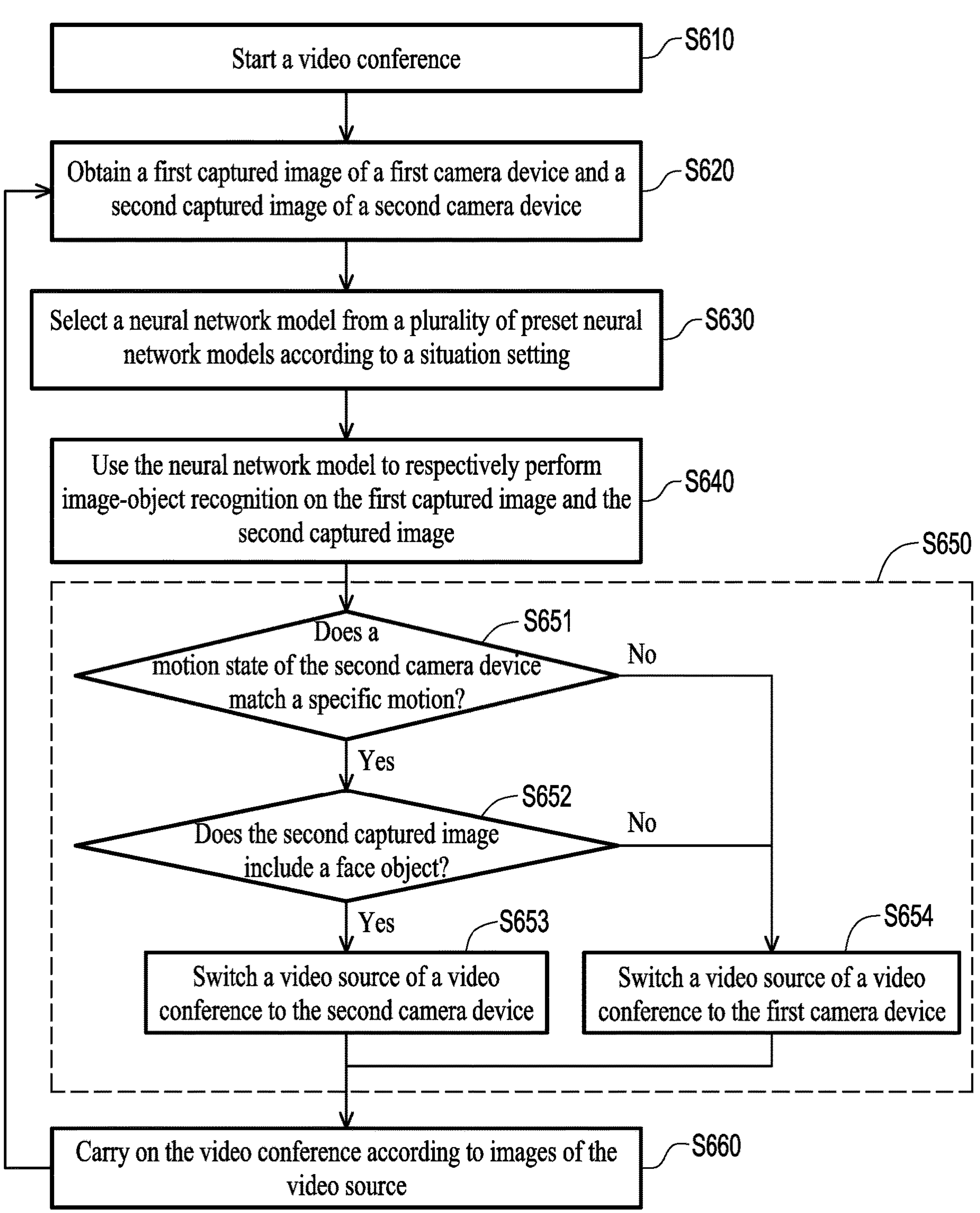
FIG. 6 is a flowchart of a switching method for a video conference according to an embodiment of the invention.

FIG. 6 is a flowchart of a switching method for a video conference according to an embodiment of the invention. Referring to FIG. 6, the method of the embodiment is applicable to the video conference system 10 of the above embodiment. Detailed steps of the embodiment are described below with reference of various components in the video conference system 10.

In step S610, the processor 140 starts the video conference. In step S620, the processor 140 obtains the first captured image of the first camera device 110 and the second captured image of the second camera device 120. In step 630, according to a situation setting, the processor 140 selects a neural network model from the preset neural network models M1. The preset neural network models M1 include an object recognition model or a face recognition model. Implementations and details of the above steps S610-S630 have been described in detail in the aforementioned embodiments of FIG. 1 to FIG. 5, which will not be repeated here.

In step S640, the processor 140 uses the neural network model to respectively perform image-object recognition for the first captured image and the second captured image. In the embodiment, the processor 140 selects the face recognition model from the preset neural network models M1. In some embodiments, the face recognition model may recognize a face object from an input image. In step S650, the processor 140 switches the video source of the video conference to the first camera device 110 or to the second camera device 120 according to the model recognition result of the first captured image and the model recognition result of the second captured image. Here, step S650 may be implemented as steps S651 to S655.

It should be noted that in step S651, according to sensing data of a motion sensor 112, the processor 140 determines whether a motion state of the second camera device 120 matches a specific motion. By using the motion sensor 121 of the second camera device 120, the processor 140 may detect the motion state and a device posture of the second camera device 120 in a three-axis motion space, and accordingly determine whether the motion state of the second camera device 120 is complied with a specific motion. For example, it is assumed that the second camera device 120 is a mobile phone device, the processor 140 may determine whether the second camera device 120 is lifted by the user to perform a photographing operation based on the sensing data of the motion sensor 121.

In step S652, in response to the motion state of the second camera device 120 complying with the specific motion (determined as yes in step S651), the processor 140 determines whether the second captured image includes a face object. In step S653, in response to the fact that the sensing data of the motion sensor 121 matches the specific motion and the neural network model detects that the second captured image includes the face object (determined as yes in step S653), the processor 140 switches the video source of the video conference to the second camera device 120.

In step S654, in response to the fact that the sensing data of the motion sensor 121 does not comply with the specific motion or the neural network model detect that the second captured image does not include the face object (determined as no in step S651 or determined as no in step S652), the processor 140 switches the video source of the video conference to the first camera device 110. In step S660, the processor 140 carries out a video conference according to images of the video source.

For example, the first camera device 110 may be a built-in main camera of a notebook computer, and the second camera device 120 may be a mobile phone device. When the user has to leave his seat, the user may hold up the mobile phone device to take a picture of his face. Therefore, the processor 140 may switch the video source of the video conference to the mobile phone device according to sensing data of a motion sensor of the mobile phone device and the second captured image. In this way, even if the user has to leave his seat, other conference participants may still continue to see the user's face image on the video conference screen.

Figure 7:
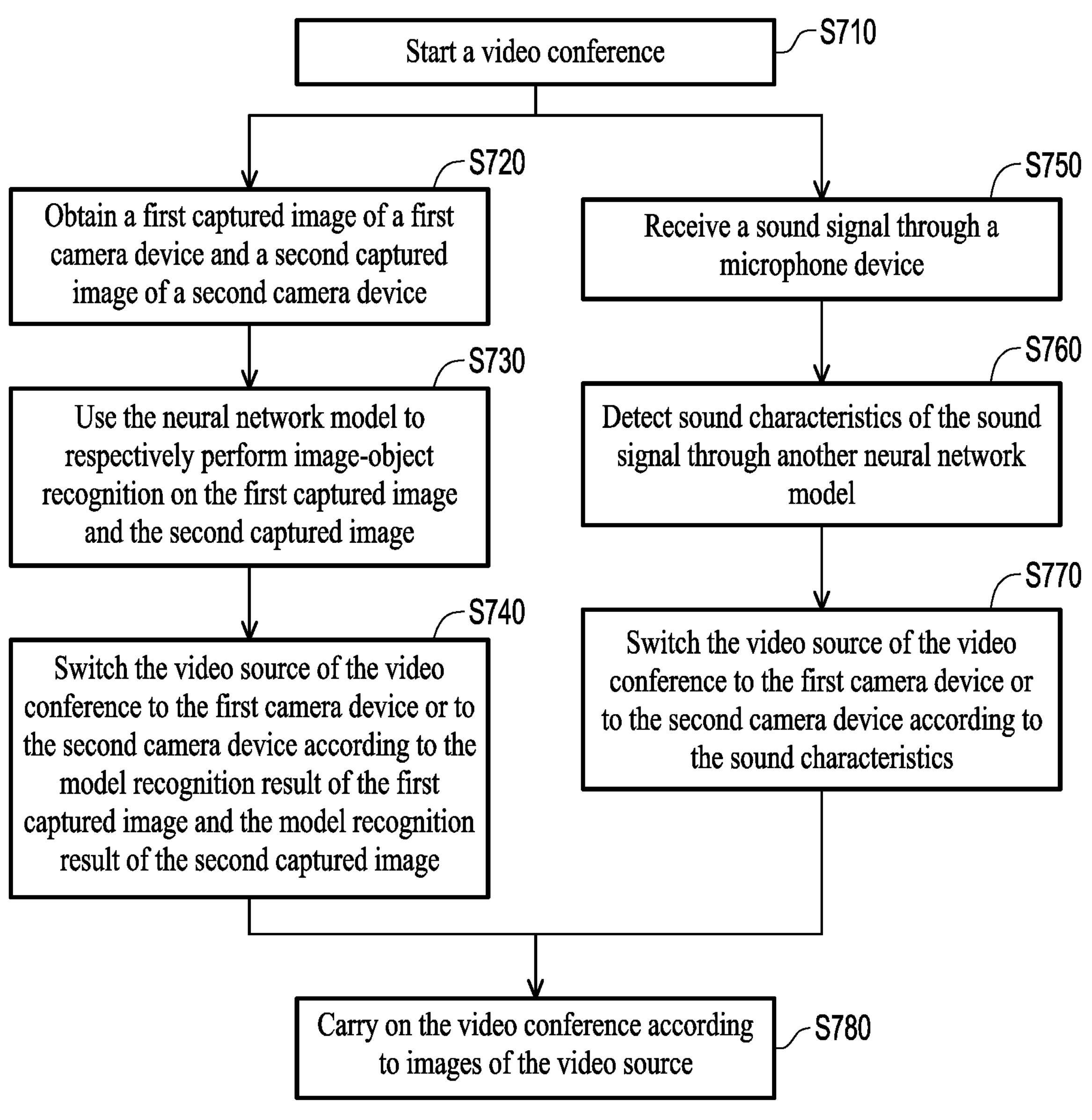
FIG. 7 is a flowchart of a switching method for a video conference according to an embodiment of the invention.

FIG. 7 is a flowchart of a switching method for a video conference according to an embodiment of the invention. Referring to FIG. 7, the method of the embodiment is applicable to the video conference system 10 of the above embodiment. Detailed steps of the embodiment are described below with reference of various components in the video conference system 10.

In step S710, the processor 140 starts the video conference. In step S720, the processor 140 obtains the first captured image of the first camera device 110 and the second captured image of the second camera device 120. In step 730, the processor 140 uses the neural network model to respectively perform image-object recognition for the first captured image and the second captured image. In step S740, the processor 140 switches the video source of the video conference to the first camera device 110 or to the second camera device 120 according to the model recognition result of the first captured image and the model recognition result of the second captured image. Implementations and details of the above steps S710-S740 have been described in detail in the aforementioned embodiments of FIG. 1 to FIG. 6, which will not be repeated here.

In step S750, the processor 140 receives a sound signal through the microphone device 122 or the microphone device 150. In some embodiments, the processor 140 receives a first sound signal through the microphone device 150 and receives a second sound signal through the microphone device 122.

In step S760, the processor 140 detects sound characteristics of the sound signal through another neural network model. The sound characteristics include a voiceprint, etc. In some embodiments, the processor 140 detects the sound characteristics of the second sound signal of the microphone device 122 through the another neural network model, and detects the sound characteristics of the first sound signal of the microphone device 150 through the another neural network model.

In step S770, the processor 140 switches the video source of the video conference to the first camera device 110 or to the second camera device 120 according to the sound characteristics. In some embodiments, the processor 140 may determine whether a voiceprint of the second sound signal of the microphone device 122 matches a voiceprint of the user. When the voiceprint of the second sound signal matches the voiceprint of the user, the processor 140 may determine whether a sound pickup distance of the second sound signal is less than a preset distance. When the sound pickup distance of the second sound signal is less than the preset distance, the processor 140 may switch the video source of the video conference to the second camera device 120. On the contrary, when the voiceprint of the second voice signal of the microphone device 122 does not match the registered voiceprint of the user or the sound pickup distance of the second voice signal is greater than the preset distance, the processor 140 may switch the video source of the video conference to the first camera device 150. In step S780, the processor 140 carries out the video conference according to the images of the video source.

For example, the first camera device 110 may be a built-in main camera of a notebook computer, and the second camera device 120 may be a mobile phone device. When the user has to leave his seat, the user may carry the mobile phone device to continue taking photos and picking up sounds. Therefore, the processor 140 may switch the video source of the video conference to the mobile phone device according to the sound characteristics of the sound signal received by the microphone device of the mobile phone device. In this way, even if the user has to leave his seat, other conference participants may still continue to see the user's face image on the video conference screen.

Figure 8A:
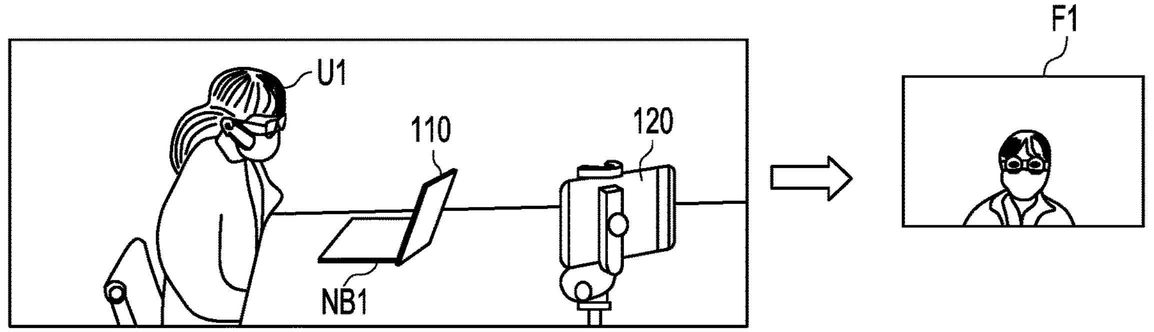
FIG. 8A and FIG. 8B are schematic diagrams of a video conference scene according to an embodiment of the invention.
Figure 8B:
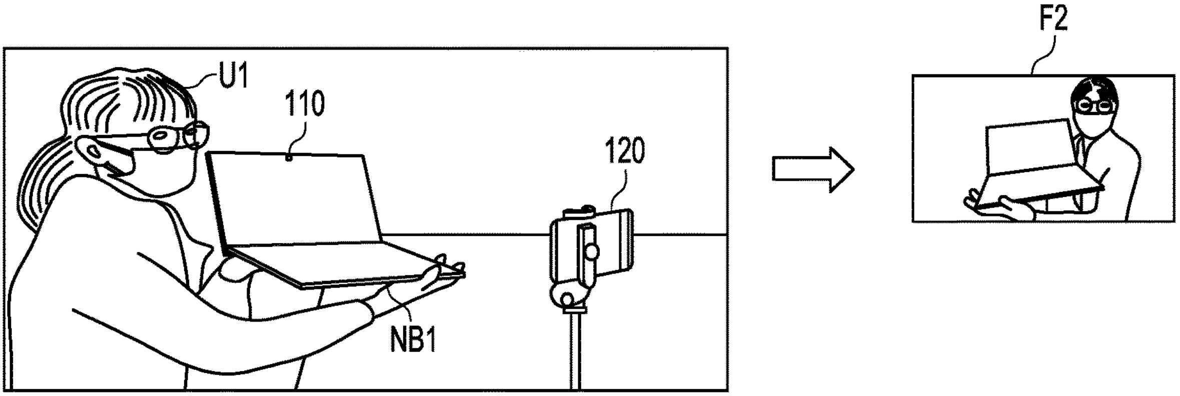

FIG. 8A and FIG. 8B are schematic diagrams of a video conference scene according to an embodiment of the invention. Referring to FIG. 8A and FIG. 8B, it is assumed that the first camera device 110 is a built-in main camera of a notebook computer NB1, and the second camera device 120 is a mobile phone device installed at a far end of the seat. Referring to FIG. 8A, a user U1 uses the notebook computer NB1 at his seat to participate a video conference. The first camera device 110 of the notebook computer NB1 is first set as a video source of the video conference. Therefore, a captured image F1 captured by the first camera device 110 may be transmitted to other conference participants of the video conference. Thereafter, referring to FIG. 8B, the user U1 leaves the seat and moves to the front of the second camera device 120, and displays the notebook computer NB1 as an introduction product. Therefore, in response to the fact that the second captured image includes a human face and the corresponding face angle is complied with the angle condition, the video source of the video conference may be switched from the first camera device 110 to the second camera device 120. Therefore, a captured image F2 captured by the second camera device 120 may be transmitted to other conference participants of the video conference.

In summary, in the embodiments of the invention, when using multiple camera devices for a video conference, the user's video screen may be automatically switched according to a conference situation requirement, thereby effectively enhancing the communication efficiency and fluency of the video conference. In addition, according to different application situation requirements, an appropriate neural network model may be used to recognize image content, thereby flexibly switching the video source of the video conference according to actual situation requirements.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A switching method for a video conference, adapted to a video conference system comprising a first camera device and a second camera device, the switching method comprising:

obtaining a first captured image of the first camera device and a second captured image of the second camera device;

respectively performing image-object recognition for the first captured image and the second captured image by using a neural network model;

switching a video source of the video conference to the first camera device or to the second camera device according to a model recognition result of the first captured image and a model recognition result of the second captured image comprises:

switching the video source of the video conference to the first camera device or to the second camera device by controlling an output data stream of device media foundation transform (DMFT); and carrying out the video conference based on images from the video source.

2. The switching method for the video conference according to claim 1, wherein before respectively performing the image-object recognition for the first captured image and the second captured image by using the neural network model, the switching method comprises:

selecting the neural network model from a plurality of preset neural network models according to a situation setting, wherein the preset neural network models comprise an object recognition model or a face recognition model.

3. The switching method for the video conference according to claim 1, wherein switching the video source of the video conference to the first camera device or to the second camera device according to the model recognition result of the first captured image and the model recognition result of the second captured image comprises:

switching the video source of the video conference to the second camera device in response to the neural network model detecting that the second captured image comprises a specific object.

4. The switching method for the video conference according to claim 1, wherein switching the video source of the video conference to the first camera device or to the second camera device according to the model recognition result of the first captured image and the model recognition result of the second captured image comprises:

switching the video source of the video conference to the first camera device in response to the neural network model detecting that the second captured image does not comprise the specific object.

5. The switching method for the video conference according to claim 1, wherein switching the video source of the video conference to the first camera device or to the second camera device according to the model recognition result of the first captured image and the model recognition result of the second captured image comprises:

switching the video source of the video conference to the second camera device in response to the neural network model detecting that a face angle of a face object in the second captured image is complied with an angle condition.

6. The switching method for the video conference according to claim 1, wherein the second camera device comprises a motion sensor, and switching the video source of the video conference to the first camera device or to the second camera device according to the model recognition result of the first captured image and the model recognition result of the second captured image comprises:

determining whether a motion state of the second camera device is complied with a specific motion based on sensing data of the motion sensor; and switching the video source of the video conference to the second camera device in response to the motion state of the second camera device being complied with the specific motion and the neural network model detecting that the second captured image comprises a face object.

7. The switching method for the video conference according to claim 1, wherein the video conference system comprises a microphone device, and the switching method further comprises:

receiving a sound signal through the microphone device; and detecting sound characteristics of the sound signal through another neural network model; and switching the video source of the video conference to the first camera device or to the second camera device according to the sound characteristics.

8. A video conference system, comprising:

a first camera device;

a second camera device;

a storage device, storing a plurality of instructions;

a processor, coupled to the first camera device, the second camera device and the storage device, and executing the instructions to:

obtain a first captured image of the first camera device and a second captured image of the second camera device;

respectively perform image-object recognition for the first captured image and the second captured image by using a neural network model;

switch a video source of a video conference to the first camera device or the second camera device according to a model recognition result of the first captured image and a model recognition result of the second captured image; and carry out the video conference based on images from the video source, wherein the processor executes the instructions to:

switch the video source of the video conference to the first camera device or to the second camera device by controlling an output data stream of device media foundation transform (DMFT).

9. The video conference system according to claim 8, wherein the storage device records a plurality of preset neural network models, and the processor executes the instructions to:

select the neural network model from the plurality of preset neural network models according to a situation setting, wherein the preset neural network models comprise an object recognition model or a face recognition model.

10. The video conference system according to claim 8, wherein the processor executes the instructions to:

switch the video source of the video conference to the second camera device in response to the neural network model detecting that the second captured image comprises a specific object.

11. The video conference system according to claim 8, wherein the processor executes the instructions to:

switch the video source of the video conference to the first camera device in response to the neural network model detecting that the second captured image does not comprise the specific object.

12. The video conference system according to claim 8, wherein the processor executes the instructions to:

switch the video source of the video conference to the second camera device in response to the neural network model detecting that a face angle of a face object in the second captured image is complied with an angle condition.

13. The video conference system according to claim 8, wherein the second camera device comprises a motion sensor, and the processor executes the instructions to:

determine whether a motion state of the second camera device is complied with a specific motion based on sensing data of the motion sensor; and switch the video source of the video conference to the second camera device in response to the motion state of the second camera device being complied with the specific motion and the neural network model detecting that the second captured image comprises a face object.

14. The video conference system according to claim 8, further comprising a microphone device coupled to the processor, wherein the processor executes the instructions to:

receive a sound signal through the microphone device; and detect sound characteristics of the sound signal through another neural network model; and switch the video source of the video conference to the first camera device or to the second camera device according to the sound characteristics.

* * * * *